Patented July 2, 1935

2,006,700

UNITED STATES PATENT OFFICE 2,006,700

PROCESS FOR THE PRODUCTION OF VITAMIN FREE CASEIN

George C. Supplee, George E. Flanigan, and Raymond C. Bender, Bainbridge, N. Y., assignors to The Borden Company, New York, N. Y., a corporation of New Jersey No Drawing. Application December 9, 1931, Serial No. 579,984

20 Claims. (Cl. 99—11)

This invention proposes a method for the production of casein free from the water-soluble growth-promoting factors or vitamins, specifically vitamins "B" and "G" as now defined.

The use of casein as a constituent of various rations required for the biological assay of the water soluble vitamins, particularly vitamins "B" and "G" as now defined, is a common practice where such assays or experimental studies are undertaken. In order that the results from such procedures may be valid, it is necessary that the various constituents of the basal ration, including the casein, be freed from measurable amounts of the factors which it is sought to determine in the substance to be tested. In the prosecution of such tests it is therefore necessary to use a casein which has been subjected to suitable treatment for the purpose of eliminating the small traces of such vitamins, adsorbed or combined with the casein, for example during its preparation or production from fluid milk.

The usual grades of commercial casein contain varying amounts of the water-soluble vitamins "B" and "G", and probably other water soluble growth-promoting factors, vitamin-like in character, and as a consequence various supplementary procedures have been applied to such caseins in order to render them suitable for the type of experimental purposes above indicated. The methods which have been employed are generally tedious and laborious, frequently involving numerous successive leachings or washings with various solvents, for illustration, weak acid and alcohol; or resort may be made to successive re-solutions and re-precipitations. It is the usual and common practice to apply one or more of such methods to the dry casein of commerce in order to render such casein suitable for the purpose under consideration.

The purpose of this specification is to set forth a method for the production of casein free from the contaminants herein referred to, the method being applicable to the preparation of casein direct from liquid milk, as well as to dry commercial casein.

During the course of numerous investigations on the water-soluble vitamins contained in milk we have discovered that these factors, particularly vitamins "B" and "G" as now defined and the other suggested water-soluble growth-promoting vitamins in milk, are very soluble in solutions of highly ionizable salts and the employment of such salts as for example sodium chloride in varying proportions is highly efficacious in removing these substances from casein. This discovery has been applied to the preparation of a vitamin-free casein direct from fluid milk, wherein the casein can be prepared wholly free from the vitamins in question, in contradistinction to the casein commercially prepared by the usual methods. Not only may a casein free from water-soluble vitamins be prepared direct from fluid milk by our method, but a product of similar properties may also be prepared by treating dry commercial casein as hereinafter described.

The following is a specification of the method as applied to fluid milk, but we do not limit ourselves to all the details of this illustrative example.

Thirty thousand pounds of skim milk are heated to 95° F. in a suitable vat provided with an agitator, preferably of the variable speed type. To this milk there is added about 169 pounds of commercial grade hydrochloric acid (sp. gr. about 1.18) which has been diluted, one part acid to ten parts water. Agitation of the mass of milk is continued at a moderate rate while approximately two-thirds of the required acid is being slowly added over a period of 30 to 40 minutes. When approximately two-thirds of the acid has been added the agitation is increased to provide violent mixing or stirring. During this period of violent agitation the remainder of the required amount of acid is added. The pH value of the milk-acid mixture should be at substantially 4.6, or the isoelectric point of the casein when the required amount of acid has been added. Due to the slight variations inherent in the composition of various milks, the exact amount of acid as stated above may vary to a certain degree. However, the total amount of acid to be added is such that the pH value of the mixture will be the isoelectric point of the casein or substantially in the neighborhood of 4.6. The pH value at which the casein is precipitated should best be substantially 4.6, and while the actual optimum pH value for precipitation of casein is determined by the amount of ionized substances present, the figure as given is substantially correct for the precipitation of casein from the natural serum of milk. However, we have evidence which indicates that the pH at this point may lie between 4.45 and 4.75 without serious detriment to the process and product as a whole. It should be understood, however, that the optimum pH value used in individual cases should be as near as possible to the isoelectric point for the mixture in question, because at such point casein exists at its greatest density and therefore provides the least favorable conditions for retaining absorbed and adsorbed impurities. Furthermore, any substantial variation either side of the isoelectric point will result in partial solution of the casein, thereby causing unnecessary losses and inconvenience in the practical handling of the precipitate.

The pH values as stated in this application refer to values determined by electrometric methods and not colorimetric methods.

After this pH value has been reached by the addition of acid, violent agitation is continued to insure a finely divided casein and to also insure completion of the reaction. The temperature at this stage should best be about 95° F., or broadly between 95° and 115° F.

The finely divided casein is allowed to settle and as much as is practicable of the supernatant fluid or whey is decanted off. It is desirable to allow the precipitated casein to settle until at least two-thirds or more, preferably nearer three-fourths of the original volume of the liquid milk can be decanted. The precipitated casein and the whey remaining therewith is now withdrawn from the vat and pressed or passed through a suitable centrifugal machine to remove more of the whey or liquor than is practicable by decantation. The excess whey is sufficiently removed if the wet casein has been reduced to a weight in the neighborhood of 2000 pounds.

The pressed or centrifuged casein is now added to 18,000 pounds of water previously heated to 95° F., or thereabouts. The casein and water suspension is now violently agitated to again insure a finely divided condition of the casein particles. Agitation should continue for a period of 10 to 15 minutes during which time the division of the casein is so thorough that the mixture assumes the appearance of milk.

Three hundred and sixty pounds of common salt—sodium chloride—free from silica gel or other salt-drying agents, is now added and thoroughly dissolved during the continued violent agitation of the mixture. At this juncture the mixture remains milky in appearance and the casein does not flocculate and settle. The pH value of the mixture will be found to be slightly above the point at which the curd was originally precipitated from the fluid milk. For example, experience has shown that if the original precipitation point was at the pH value of exactly 4.6, the pH value of this salt mixture will be about 4.65 to 4.75.

During the continued agitation of the casein-water-salt mixture, sufficient commercial grade hydrochloric acid (sp. gr. 1.18 or thereabout) is added to reduce the pH value to 3.6–3.65. Ordinarily with conditions maintained and carried out as above described the amount of acid required will be in the neighborhood of 22½ pounds. However, the amount of acid to be added at this point cannot be definitely stated. In some instances as high as 30 pounds have been required depending upon the yield of casein originally precipitated from milk. The acid added at this point may be diluted but preferably not in excess of one part of acid to four parts of water. The addition of the acid to establish a pH value of 3.6–3.65, will in the presence of the salt and curd concentration already indicated, cause the finely divided casein to quickly flocculate and settle. After the casein has settled the supernatant liquor is of a pale yellow green color as viewed en masse, but of much less depth of color than the original whey. The supernatant liquor is decanted from the precipitated casein and the remaining casein again pressed or centrifuged as already described.

This pressed or centrifuged casein is again placed in 18,000 pounds of water previously heated to 95° F., or thereabouts. The mixture is again thoroughly agitated to insure fine division of the casein particles. Two hundred and eighty pounds of common salt of the grade previously specified are now added and dissolved under violent agitation as already stated. This quantity of salt added to the volume of water and amount of curd already indicated will cause the flocculation and precipitation of the suspended casein if the mixture is at a pH value of 3.75–3.8 or thereabouts. At this point it is desirable to determine the pH value and if it is found to be outside the range just indicated the addition of small amounts of alkali (sodium hydroxide 1:1) or small amounts of concentrated commercial hydrochloric acid (sp. gr. 1.18) should be added to bring the pH value within the particular limits. Whether or not the adjustment of the pH value at this point by the addition of acid or alkali is required depends to a certain degree upon the efficiency of the removal of the fluid from the casein of the previous salt treatment and also to a certain degree on the fineness of the casein particles, and possibly on the amount and character of the impurities in the salt used.

With the pH value adjusted to the point just indicated in the presence of the amount of salt last specified, the curd will readily flocculate and settle. After this treatment, this supernatant liquor is of a paler yellow green tinge than after the first salt treatment. It may have a distinct blue cast when viewed en masse. Our experience has indicated that the disappearance of the yellowish green and the advent of the bluish color is an indication that the process of removal of the undesired impurities is being satisfactorily accomplished. After this second salt treatment the supernatant liquor is again drawn from the precipitated casein and the wet material is again pressed or centrifuged.

The pressed or centrifuged curd from the second salt treatment is again returned to 18,000 pounds of water heated to 95° F. or thereabouts. The casein is again violently agitated to insure fine division of the particles and 180 pounds of salt of the grade previously specified are added in the manner as formerly described. If the various operations up to this point have been conducted uniformly and efficiently the pH value of the mixture after the last addition of salt will be in the neighborhood of 3.8 and the casein, upon ceasing agitation, will immediately flocculate and settle. In case flocculation does not take place immediately it is desirable to determine the pH value and if necessary adjust to 3.8–3.85. At this juncture the supernatant liquor will be of a sea-blue color when viewed en masse. Such a result is an indication of complete removal of the impurities which the method is proposed to eliminate.

After removal of the supernatant liquor the finely divided and precipitated casein is again pressed or centrifuged and returned to 18,000 pounds of water previously heated to 95° F. After a period of a few minutes violent agitation the water-casein suspension will have a pH value in the neighborhood 4.1–4.3. The casein at this pH value will not now readily flocculate and settle. It is therefore necessary to adjust the pH value of the mixture to 4.56–4.6, or the isoelectric point of casein. This is accomplished by adding during violent agitation sufficient concentrated sodium hydroxide (1:1) to bring the pH value within the range above specified. Ordinarily 12 to 18 pounds of the concentrated alkali are required. When the proper pH value is reached the casein suspension immediately flocculates and settles. If the process has been properly conducted the supernatant liquor is water-clear and of a slightly bluish cast when viewed en masse. The supernatant liquor is decanted and the casein mass pressed or centrifuged as previously described.

The pressed or centrifuged casein is again returned to 18,000 pounds of water previously heated to 95° F. or thereabouts. Thorough agitation is applied to again insure fine division of the particles. A pH value of the suspension at this juncture will ordinarily show a value of 4.4–4.45. Concentrated sodium hydroxide (1:1) is now added during violent agitation of the mixture to bring the pH value to the isoelectric point of casein or at substantially 4.55–4.6. The amount of concentrated sodium hydroxide required for this adjustment is ordinarily less than one pound. As the proper pH value is reached the casein quickly flocculates and settles. The supernatant liquor is water clear with little or no color as viewed en masse.

After the precipitation last mentioned the supernatant liquor is decanted off and the casein pressed or centrifuged and immediately dried in any suitable contrivance. A tunnel dryer of the usual type of construction has been used with satisfaction. This drying can be conducted in the manner now commonly used in commercially drying casein. The dried casein may be ground to any degree of fineness and is then ready for use.

The product prepared as above is free from the water soluble vitamins as now known. The product requires no further purification processes to free it from these factors.

Our invention may also be applied to previously dried commercial casein, precipitated and prepared according to methods commonly used for the production of such product.

As an example, if it were desired to apply our method for the purification of dry commercial casein from vitamins, the dry product finely ground in quantity similar to that resulting from the initial precipitation direct from the quantity of fluid milk previously designated (say about 700 to 750 lbs. of commercial dry casein) would be added to water in the proportions indicated in the previous method. The various salt and water treatments would then be applied in the manner already described, it being understood that the pH value adjustment in the presence of the various salt-water-curd ratios would be maintained substantially as above indicated.

Having explained the working of our method for preparing casein free from water soluble vitamins of milk, the novelty of the method is considered to lie in the discovery of the use of ionizable salts, for example sodium chloride wherein such salts are efficacious in removing from the casein the adsorbed or combined water-soluble vitamins, or create a physical condition in the mixture whereby the casein becomes incapable of retaining these factors; the suitable adjustment of pH values of the casein suspension in the presence or absence of ionizable salt where and when indicated, for the purpose of rendering effective the physical or chemical or both physical and chemical action of the solvent,—the solvent being considered to be an ionizable substance, more specifically an ionizable salt in solution; the use of a salt of appropriate concentration; the use of a salt of appropriate concentration in combination with an appropriate pH value; or a solution without added ionizable salt but appropriate pH value, each or all of which specified conditions contribute to the desired result.

The working of our method as given in the illustration is submitted as an exemplification of the principles involved and it is to be understood that departure therefrom in such matters as the number of salt treatments, relative amounts of curd and water, deviation in pH value, variations in degree of agitation, deviations in temperature, variations in the amount of salt in relation to casein and water, variations in the kind of salt used, and other modifications of conditions embodying the principles of the use of ionizable salt with or without correlation of pH value would be considered as still within the scope of our invention.

In the above examples we have referred to the use of sodium chloride as the preferred ionizable salt. This material is both cheap and efficient, for the purpose. However we do not restrict the invention to the use of this salt, since other ionizable salts can be used, for example, the soluble chlorides, sulphates of alkali or alkaline earth metals, sodium dihydrogen phosphate, etc. Sodium chloride is however, the preferred material, for reasons of economy.

It will be obvious that when using the other salts mentioned in the last paragraph instead of sodium chloride, the pH values at the several stages should be so adjusted as to give similar physical condition of the casein, at the different stages, to correspond to that given herein.

While we do not wish to be committed to any theory of the mechanism of the phenomena concerned in our discovery, it may be stated that the presence of various ions, or the degree of ionization of various substances in the solution have a marked effect on the physical properties and reactions of organic matter which may be present, particularly the proteins (casein, for example) contained in milk; and we have discovered that this effect upon the physical condition of the milk proteins determines the amount of water soluble vitamins which may be absorbed and retained by said proteins.

In the process described above, the casein is initially precipitated from the milk, preferably, although not necessarily, at the optimum pH value (concentration of hydrogen ions) which is known to be conducive to the flocculation of casein at its greatest density and in which condition it (the casein) has a minimum property for retaining extraneous material—extraneous molecules or ions. However, it has been determined that even though precipitation of the casein is carried out under optimum conditions, such conditions applied during the initial precipitation from milk, do not produce a casein which is entirely free from the water soluble vitamins. This fact is well known and hence the necessity for the supplementary purification procedures now applied to casein for the purpose of obtaining a vitamin-free product. We have determined that the presence of ionizable substances, as for example a highly ionizable salt such as sodium chloride, greatly facilitates the removal of such absorbed and/or adsorbed and/or combined water-soluble material. This is due to the ionic condition of the suspension.

In our process the casein, after initial precipitation from the milk, is placed in a solution of ionizable salt (in the example 2% sodium chloride). In the presence of this concentration of sodium and chlorine ions, the optimum concentration of hydrogen ions, (pH value) for flocculation of the casein is no longer at pH 4.6, as for the precipitation from the serum of natural milk, but is now found to be at pH 3.6–3.65. If a greater or lesser percentage of sodium chloride were used, the optimum pH would have been different (e. g. a somewhat lower pH value if more of the salt is used). In our process we have found it preferable, although not requisite, to use relatively low concentrations of the ionizable salt, because by so doing we have less of the added salt and excess acid to wash out from the final product. It is desirable that the final product be free, or substantially free, from the ionizable salt and excess acid as well as free from the water soluble vitamins. The ionizable salt treatment is to be considered, therefore, as an agency of utility only for the purpose of removing the water soluble vitamins, and once its function is fulfilled the salt should not be allowed to remain as contaminating material in the final product.

In the illustrative example given above, we have given detailed data and relationships involving three treatments with dilute ionizable salt (sodium chloride) and two subsequent treatments without such salt. When more than one salt treatment is applied, although this is not a necessary requisite to our process, it is desirable to add less of the ionizable substance for each subsequent treatment for the reason that there is less of the water soluble vitamin to remove from the casein after the first treatment; also so that there will be less of the added substance to remove from the final product. Accordingly, in view of the general principle that optimum conditions for the precipitation and flocculation of casein are determined by the degree of ions present (in this instance sodium and chlorine ions and hydrogen ions- pH value) it will be noted that with a lower concentration of the sodium and chlorine ions, a lower concentration of the hydrogen ions (higher pH value) is required to bring about optimum conditions for the flocculation of the casein.

In the example cited two subsequent treatments with water alone are applied for the purpose of washing the casein free from the added salt and acid. As the removal of salt and excess acid approaches 100% completion the optimum pH at which the casein is again flocculated approaches its iso-electric point of pH 4.6. In the case in question the salt was practically all removed by the first water treatment as shown by the fact that the casein did not flocculate at pH 4.1–pH 4.3 but did require adjustment to pH 4.5–4.6 in order to create optimum conditions for flocculation.

While the first water washing removed substantially all the salt, the excess acid ("excess acid" being defined as such an amount as to cause a pH value below 4.6) was not entirely removed as shown by the fact that the solution showed a pH value of 4.1–4.3.

The second treatment with water removed more acid as shown by the increased pH value to 4.4–4.5. The excess acid now present is very slight and only a slight adjustment was required to bring the suspension to pH 4.6 or the optimum point of flocculation of the casein in the absence or substantial absence of ionizable salts.

We claim:—

1. A method for the preparation of casein wherein the casein is precipitated from milk at substantially its isoelectric point, in a fine state of division, subsequently subjecting the casein to at least one treatment with a solution containing a highly ionized salt and wherein the pH value of the mixture is adjusted to a point permitting rapid flocculation and precipitation of the casein in the presence of the salt and casein concentration.

2. Process as in claim 1, wherein the casein flocculated from the salt solution is subsequently flocculated and precipitated at substantially its normal isoelectric point, and in the substantial absence of the added ionized salt.

3. A process as in claim 1, wherein sodium chloride is used as the ionized salt.

4. A process of preparing casein in a substantially vitamin-free state which comprises first precipitating casein from skim milk by an acid, subsequently subjecting the casein to at least one treatment in an aqueous solution of a readily ionizable salt, in which solution the pH value is lower than in the precipitation stage and such as to give rapid flocculation and precipitation of the casein in said salt solution.

5. Process as in claim 4, followed by suspension of the casein in water substantially without added ionizable salt, and flocculation and precipitation of the casein from said water at substantially the isoelectric point of the casein.

6. Process as in claim 4 in which the ionizable salt is sodium chloride.

7. A process of preparing casein which is substantially vitamin-free which comprises precipitating casein from skim milk at a pH of about 4.45 to 4.75, thereafter washing the casein in water containing a highly ionized salt, at pH values below that used in the precipitation step, and subsequently washing in water at about pH 4.55 to 4.6, enough washings being used, in all, to substantially completely remove the vitamins from the casein.

8. In the removal of vitamins from casein, the herein described step of suspending previously precipitated casein in a bulk of an aqueous solution of a highly ionized salt, and bringing the pH of the mass to a point at which the casein rapidly flocculates from such suspension.

9. In the preparation of casein substantially vitamin-free, the steps of suspending casein in a solution of a highly ionized salt, and bringing the pH of the liquid mass to a point at which the casein rapidly flocculates and precipitates, and separating the casein from the bulk of the liquor, and repeating said cycle of steps at least once, the concentration of salts in the solutions decreasing in the successive cycles, and the pH increasing in the successive cycles.

10. Process as in claim 9, followed by suspension of the casein in water and adjustment of the pH to a higher level than the pH in the presence of the salts and such as to flocculate the casein.

11. Process as in claim 9, followed by suspension of the casein in water and adjustment of the pH to about the isoelectric point of the casein.

12. A process of producing vitamin-free casein, which comprises acidulating warm skim milk to a pH value between about 4.45 and 4.75, and separating the bulk of the whey from the casein, subjecting the casein to a series of washings with warm water containing a substantial amount of a readily ionizable salt, and in these washings the pH being substantially below that used in the above precipitation step, then subjecting said casein to a further series of washings in warm water, at a pH substantially within the range 4 to 4.6, and continuing such washings until the casein is vitamin-free.

13. In the removal of vitamins from casein, the herein described improvement which comprises repeatedly suspending the casein in warm water containing a highly ionized salt, and causing precipitation of the casein from the water at pH between about 3.6 to 3.85, and removal of the bulk of the water, and then subjecting said casein to a further series of washings in warm water, at a pH substantially within the range 4 to 4.6, and continuing such washings until the casein is vitamin-free.

14. A process for producing a vitamin-free casein comprising subjecting the casein to successive washings with solutions containing a highly ionized salt until the yellowish green color of the supernatant liquor disappears.

15. A process as in claim 14 in which the casein is initially precipitated at the isoelectric point and the subsequent flocculations are conducted at the respective isoelectric points of the casein suspended in the wash solutions.

16. A method for separating vitamins from casein, comprising agitating the casein with a solution containing a highly ionized salt at a pH value below the isoelectric point of casein in an aqueous suspension substantially free from highly ionized salts, said pH value being such as to rapidly flocculate the suspended casein.

17. A method as defined in claim 16 in which the casein is thereafter agitated with a solution containing the highly ionized salt in lower concentrations, said last mentioned solution being at a higher pH value than the initial treatment with the solution of the salt.

18. A method as defined in claim 16 in which the casein is thereafter agitated with acidified water at substantially the isoelectric point of casein in an aqueous suspension substantially free from highly ionized salts.

19. A method as defined in claim 16 in which the highly ionized salt is sodium chloride.

20. A method for preparing vitamin-free casein comprising precipitating casein from milk at substantially its isoelectric point, subsequently agitating the casein with a solution containing a highly ionized salt and at substantially the isoelectric point of the casein in the solution of the salt, and thereafter agitating the casein with acidified water at substantially the same pH as that of the initial precipitation.

GEORGE C. SUPPLEE.
GEORGE E. FLANIGAN.
RAYMOND C. BENDER.